US008170475B2

(12) United States Patent
Oh et al.

(10) Patent No.: US 8,170,475 B2
(45) Date of Patent: May 1, 2012

(54) NGSO COMMUNICATION APPARATUS FOR EXTENDING OPERATION TIME AND REDUCING NUMBER OF SATELLITES USING ATC

(75) Inventors: Dae Sub Oh, Daejeon (KR); Do-Seob Ahn, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 475 days.

(21) Appl. No.: 12/427,130

(22) Filed: Apr. 21, 2009

(65) Prior Publication Data
US 2010/0123620 A1    May 20, 2010

(30) Foreign Application Priority Data
Nov. 18, 2008    (KR) .......................... 10-2008-0114740

(51) Int. Cl.
*H04B 7/185*    (2006.01)
(52) U.S. Cl. ........ 455/13.1; 455/428; 455/430; 342/352
(58) Field of Classification Search .................. 455/12.1, 455/13.1, 427, 428, 430; 342/352, 353
See application file for complete search history.

(56) References Cited

U.S. PATENT DOCUMENTS

| 6,785,543 | B2 * | 8/2004 | Karabinis ..................... 455/427 |
| 7,113,743 | B2 * | 9/2006 | Karabinis .................... 455/12.1 |
| 7,218,931 | B2 * | 5/2007 | Karabinis ..................... 455/427 |
| 7,792,488 | B2 * | 9/2010 | Karabinis et al. ............ 455/12.1 |
| 2005/0282542 | A1 | 12/2005 | Karabinis |
| 2009/0131046 | A1 * | 5/2009 | Karabinis et al. ............. 455/427 |
| 2010/0248714 | A1 * | 9/2010 | Kang et al. .................... 455/427 |

FOREIGN PATENT DOCUMENTS
EP    0 748 063 A2    12/1996
KR    1020080028717 A    4/2008
* cited by examiner

*Primary Examiner* — Lincoln Donovan
*Assistant Examiner* — William Hernandez
(74) *Attorney, Agent, or Firm* — Ladas & Parry LLP

(57) ABSTRACT

Provided are a non geostationary satellite orbit (NGSO) communication apparatus that extends an operation time using an ancillary territory component (ATC) and reduces a number of satellites, and an ATC and an operating method thereof. The NGSO communication apparatus extends an operation time using an ATC and reduces a number of satellites from a first ATC that communicates with a mobile earth station (MES), and a second ATC that communicates with the first ATC to relay data between the MES and the satellite when the first ATC is unable to communication with the satellite revolving along an orbit.

10 Claims, 4 Drawing Sheets

NGSO COMMUNICATION APPARATUS FOR EXTENDING OPERATION TIME AND REDUCING NUMBER OF SATELLITES USING ATC

CROSS-REFERENCE TO RELATED APPLICATION

This application claims the benefit of Korean Patent Application No. 10-2008-0114740, filed on Nov. 18, 2008, in the Korean Intellectual Property Office, the disclosure of which is incorporated herein by reference.

BACKGROUND

1. Field of the Invention

The present invention relates to a non geostationary satellite orbit (NGSO) communication apparatus for extending an operation time and reducing a number of satellites using an ancillary territory component (ATC), and an ATC and an operation method thereof, and more particularly, to an NGSO communication apparatus that reduces a number of satellites as a service area and an operation time with respect to a single satellite is extended using a plurality of ATCs, and to an ATC and an operating method thereof.

This work was supported by the IT R&D program of MKE/IITA [2008-F-013-01, The Development of Use of Spectrum Technology and Electric Wave Resource in Millimeter-wave Band].

2. Description of the Related Art

A non geostationary satellite orbit (NGSO) communication apparatus may perform a non geostationary satellite orbit mobile satellite service (NGSO-MSS) using an NGSO, ancillary terrestrial component (ATC), and mobile earth station (MES).

FIG. 1 illustrates a configuration of a conventional NGSO communication apparatus.

Referring to FIG. 1, the NGSO communication apparatus 101 may perform NGSO-MSS using an ATC that relays data between an MES 105 and a satellite 107. In this instance, the ATC 103 may be located in a service area of the satellite, and may relay data between the MES 105 and the satellite 107 when the satellite 107 is located in a first section.

However, when the satellite moves and is located in a second section, a distance between the ATC 103 and the satellite 107 increases, thereby disconnecting a communication with the satellite 107. Accordingly, an NGSO communication apparatus 101 may use a number of satellites to provide the MES with service of the satellite 107 via the ATC 103 without becoming disconnected. For example, if it is a time when a single satellite is located in the first section, that is, when a service time is T1, the NGSO communication apparatus 101 may use 24 hours/T1 satellites or more to provide the service without becoming disconnected.

Accordingly, as a service area and operation time with respect to the single satellite increases, an NGSO communication apparatus and method that may provide service using a small number of satellites without becoming disconnected is required.

SUMMARY

An aspect of the present invention provides an NGSO communication apparatus that may reduce a number of satellites as a service area and operation time with respect to a single satellite is extended using a plurality of ancillary territorial components (ATCs), and an ATC and an operating method thereof.

According to an aspect of the present invention, there is provided a non geostationary satellite orbit (NGSO) communication apparatus for extending an operation time and reducing a number of satellites using an ancillary terrestrial component (ATC), the apparatus including a first ATC to communicate with a mobile earth station (MES), and a second ATC to communicate with the first ATC to relay data between the MES and the satellite when the first ATC is unable to communication with a satellite that revolves along an orbit.

According to an aspect of the present invention, there is provided an operating method of an ATC, the method including receiving a request for relaying data between an MES and a satellite, determining whether receiving a service from the satellite is possible, searching for other ATCs when unable to receive the service from the satellite; and relaying data between the MES and the satellite via an ATC that is able to receive service from the satellite, from among the other ATCs.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
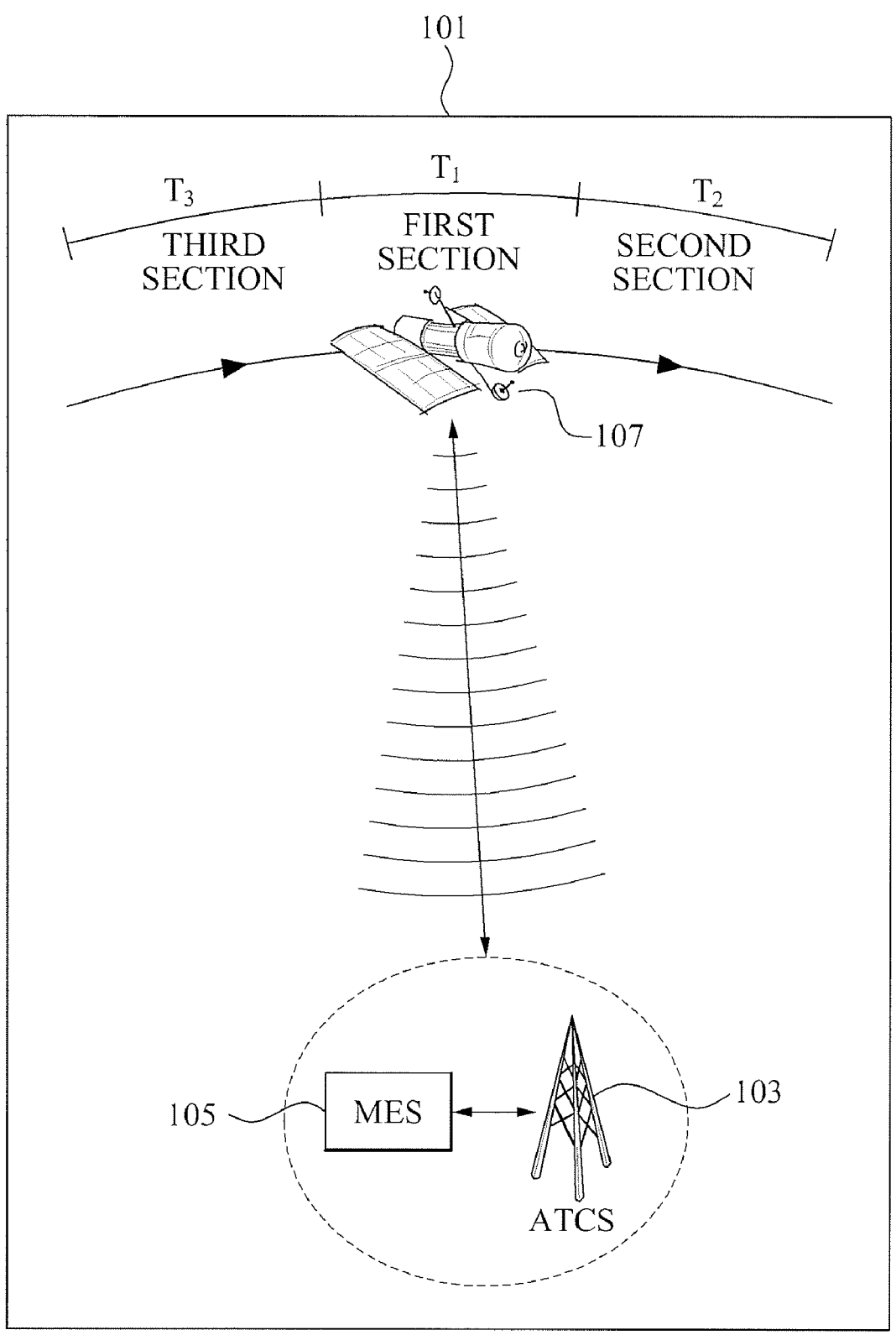
FIG. 1 illustrates a configuration of a conventional non geostationary satellite orbit (NGSO) communication apparatus.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, a non geostationary satellite orbit (NGSO) communication apparatus that extends an operation time and reduces a number of satellites using an ancillary territorial component (ATC), and an ATC and an operating method thereof according to example embodiments will be described in detail.

Figure 2:
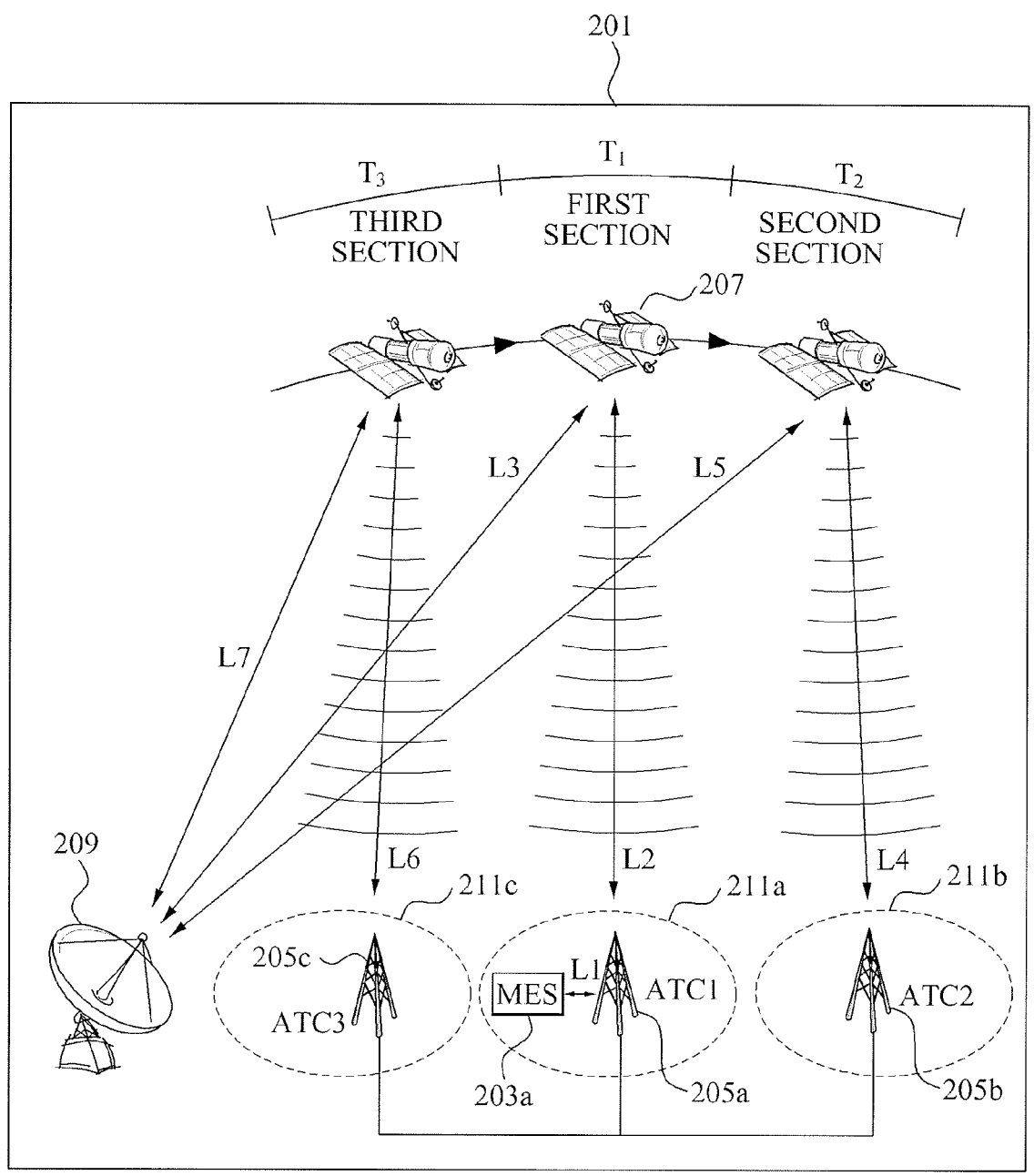
FIG. 2 is a block diagram illustrating a configuration of a NGSO communication apparatus that extends an operation time and reduces a number of satellites using an ancillary territorial component (ATC) according to example embodiments.

FIG. 2 is a block diagram illustrating a configuration of the NGSO communication apparatus that extends an operation time and reduces a number of satellites using the ATC according to example embodiments.

Referring to FIG. 2, the NGSO communication apparatus 201 may include a mobile earth station (MES) 203, ancillary territorial components 205a, 205b, and 205c, a satellite 207, and a gateway 209. Here, although the satellite revolves along an orbit, it is assumed that the satellite is located in a first section of the orbit for convenience of description.

The ATCs 205a, 205b, and 205c may include a first ATC 205a that may be located in a satellite service area enabling direct communication with the satellite 207 and a second ATC 205b and a third ATC 205c that are located outside of the satellite service area. Here, the first ATC 205a, second ATC 205b, and third ATC 205c are located in a territorial route of a satellite. In this instance, the first ATC 205a, the second ATC 205b, and the third ATC 205c are connected by wire to each other, and if necessary, may perform communication between the ATCs.

The first ATC 205a may perform communication with the MES 203 in a first area 211a. When able to communicate with the satellite 207, the first ATC 205a may relay data between the MES 203 and the satellite 207. That is, the first ATC 205a may transfer data received from the MES 203 via a link of L1 to the satellite 207 via a link of L2, and may transfer response data received from the satellite 207 via a link of L2 to the MES via the link of L1. However, when unable to communicate with the satellite 207 the first ATC 205a may communicate with the satellite 207 using the second ATC 205b or the third ATC 205c. In this instance, since the ATC that communicates with the satellite is changed, an appropriate handover technology between ATCs may be used.

When the first ATC 205a is unable to communicate with the satellite 207, the second ATC 205b may relay to perform communication with the satellite 207 by connecting the MES 203(203) of the first area 211a with the second ATC 205b via the first ATC 205a.

Here, the first area 211a, a second area 211b, and a third area 211c are divided for convenience of description. The first area 211a is a satellite service area, and the second area 211b and the third area 211c are outside of the satellite service area which is not a target area for satellite service and is an area where the ATCs 205b and 205c may be located.

The satellite 207 revolves along a given orbit and relays data between a gateway 209 and a most optimal ATC from among a plurality of ATCs that are located in the territorial orbit of the satellite. Here, the satellite 207 may communicate with an ATC having a greatest link signal. As an example, when signal strength of data received from the first ATC 205a is greater than signal strength of data received from the second ATC 205b and the third ATC 205c, the satellite 207 select the first ATC 205a to perform communication.

That is, the satellite 207 may transfer data received from the first ATC 205a via the link of L2 to the gateway 209, and transfer response data received from the gateway 209 via a link of L3 to the first ATC 205a via the link of L2.

The gateway 209 may connect a satellite communication network including the satellite 207 and MES 203 with other wireless networks.

For example, the gateway 209 may connect the MES 203 with a public switched telephone network (PSTN). In this instance, when the MES 203 attempts a call using a wired phone, the MES 203 may be connected with the PSTN via the ATCs 205a, 205b, and 205c, the satellite 207, and the gateway 209.

Hereinafter, it is assumed that the satellite 207 revolves and is located in a second section of the orbit in the NGSO communication apparatus 201.

In this instance, the satellite 207 may compare signals respectively received from the ATCs 205a, 205b, 205c and may select a most optimal ATC, that is, the second ATC 205b having the greatest signal strength, to perform communication.

In this instance, a link between the MES 203 and the first ATC 205a in the first area 211a may be connected with the satellite 207 using the second ATC 205b. That is, the second ATC 205b transfers data received from the first ATC 205a to the satellite 207 via a link of L4 and transfers response data received from the satellite 207 via the link of L4 to the first ATC 205a. Accordingly, the MES 203 may communicate with the satellite 207 via the first ATC 205a and the second ATC 205b.

Also, the satellite 207 relays data between the second ATC 205b and the gateway 209. That is, the satellite 207 may transfer data received from the second ATC 205b via the link of L4 to the gateway 209 via a link of L5, and transfer response data received from the gateway 209 via a link of L5 to the second ATC 205b via the link of L4.

The NGSO communication apparatus that may extend the operation time and reduce the number of satellites using the ATC according to example embodiments may use the ATC with respect to a single satellite, and thereby may increase a service time in a service area with respect to the single satellite from T1 to T1+T2+T3. This signifies that a number of satellites used in a non geostationary orbit providing satellite service may be reduced, as service time with respect to the single satellite increases.

As an example, in the case that the NGSO communication apparatus is to provide service for 24 hours in a service area without becoming disconnected, the NGSO communication apparatus may increase the number of satellites and provide service without becoming disconnected by performing handover to another satellite to compensate for disabled-communication since a distance between the NGSO and the ATC increases as the NGSO moves along the orbit within predetermined periods.

In this instance, when a service time with respect to the single satellite is T1, the NGSO communication apparatus may use 24 hours/T1 satellites or more.

Conversely, since service time with respect to the single satellite is T1+T2+T3, of the NGSO communication apparatus according to example embodiments may merely use 24 hours/T1+T2+T3 satellites or more. Accordingly, the NGSO communication apparatus may reduce the number of satellites in the non geostationary orbit. Therefore, the NGSO communication apparatus using the ATC according to example embodiments may provide service without becoming disconnected using a small number of satellites.

Figure 3:
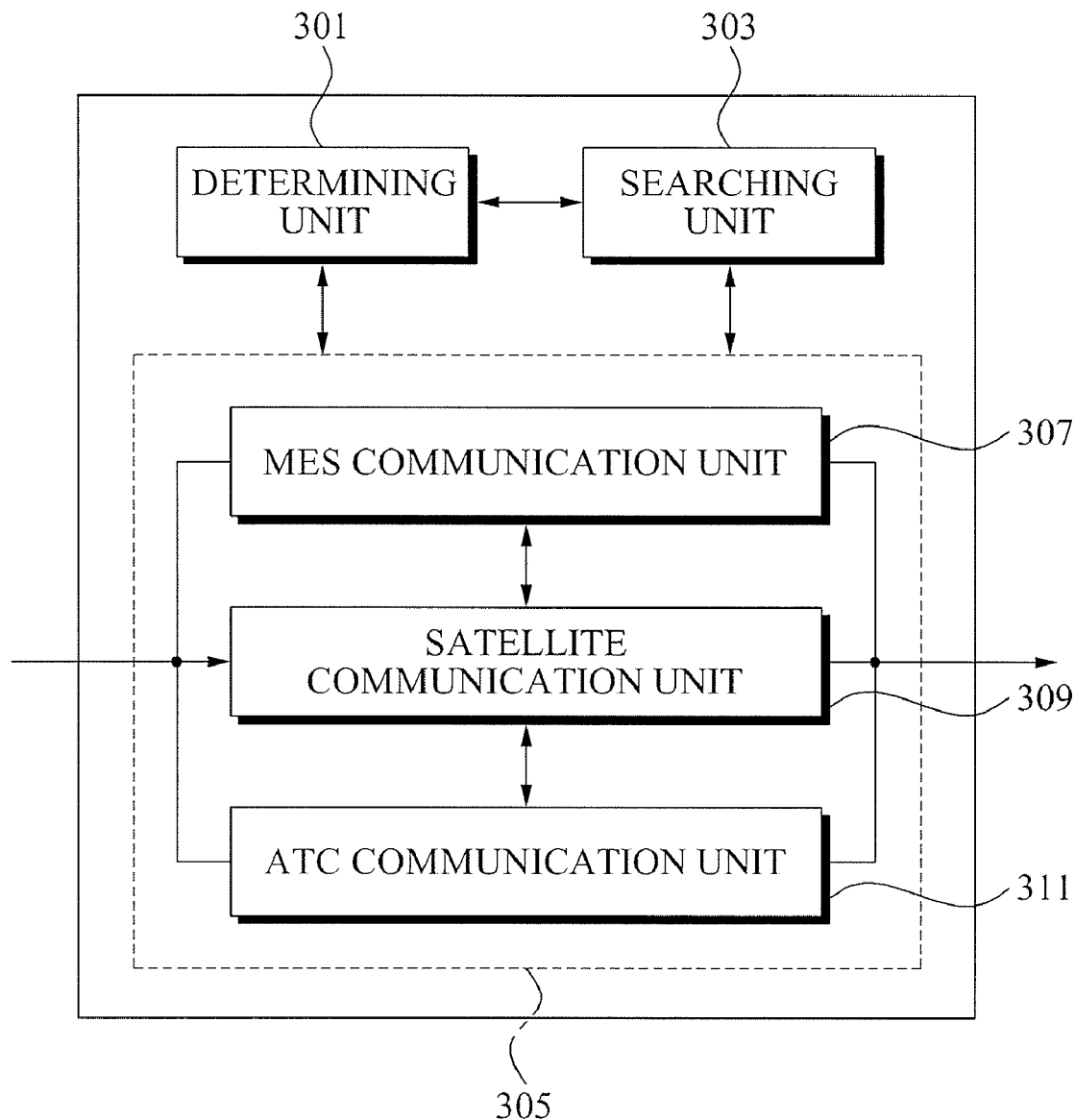
FIG. 3 is a block diagram illustrating a configuration of an ATC according to example embodiments.

FIG. 3 is a block diagram illustrating a configuration of an ATC according to example embodiments. Here, for convenience of description, it is assumed that the ATC is a first ATC 205a located in a service area.

Referring to FIGS. 2 and 3, the ATC 205a includes a determining unit 301, a searching unit 303, and a communication unit 305.

When receiving a request for relay data between an MES and a satellite 207, the determining unit 301 determines whether receiving of service from the satellite 207 is possible. That is, the determining unit 301 determines whether communication with the satellite 207 is possible based on signal strength of data received from the satellite 207, and thereby may determine whether receiving of service from the satellite 207 is possible.

When unable to receive service from the satellite 207, the searching unit 303 searches for other ATCs, that is, a second ATC 205b and a third ATC 205c.

When able to receive service from the satellite 207 as a result of the determination, the communication unit 305 transmits/receives data between the MES and the satellite 207. Here, the MES that communicates with the satellite 207 may be an MES 203 in a first area 211a.

Conversely, when unable to receive service from the satellite 207 as a result of the determination, the communication unit 305 transmits/receives data between the MES and the satellite 207 via an ATC that is able to receive service from the satellite 207 from among other ATCs 205b and 205c. The communication unit 305 may be constituted to include an MES communication unit 307 that transmits/receives data to/from the MES, a satellite communication unit 309 that transmits/receives data to/from the satellite 207, and an ATC communication unit 311 that transmits/receives data to/from the other ATCs 205b and 205c. In this instance, the MES communication unit 307 and satellite communication unit 309 perform wireless communication, whereas the ATC communication unit 311 may perform wired communication with the other ATCs 205b and 205c.

Figure 4:
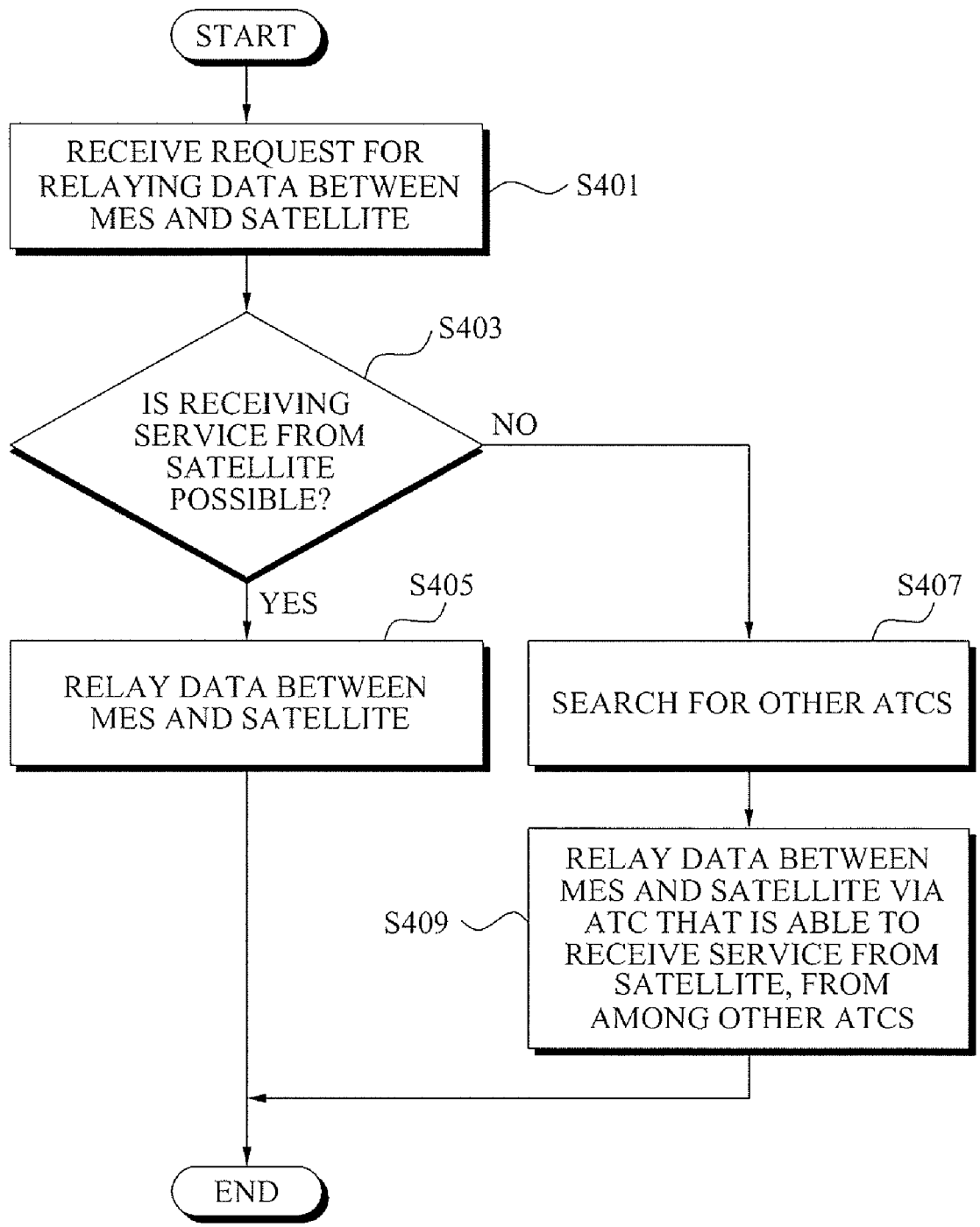
FIG. 4 is a flowchart illustrating an operating method of an ATC according to example embodiments.

FIG. 4 is a flowchart illustrating an operating method of an ATC according to example embodiments.

Referring to FIG. 4, the ATC may receive a request for relaying data between an MES and a satellite in operation S401. In this instance, the MES may receive a request for relaying the data from at least one of the MES, the satellite, and the other ATCs.

Subsequently, the ATC determines whether receiving of the service from the satellite is possible in operation S403.

In this instance, the ATC may determine whether receiving of the service from the satellite is possible based on signal strength of data received from the satellite.

For example, when the signal strength of the data received from the satellite is greater than a predetermined signal strength, the ATC may determine that receiving of the service from the satellite is possible. Also, the ATC may determine that receiving of the service from the satellite is possible, when the signal strength of the data received from the satellite is greater than a signal strength of data received from the satellite via other ATCs.

Subsequently, when unable to receive the service from the satellite as a result of the determination, the ATC relays data between the MES and the satellite in operation S405.

That is, the ATC may transfer data received from the MES to the satellite, and may transfer response data with respect to the data received from the satellite to the MES. In this instance, the response data may be response data that the satellite receives from the gateway after the satellite transfers the data received from the ATC.

Conversely, when unable to receive the service from the satellite as a result of the determination, the ATC searches for other ATCs in operation S407.

Through the searching process, the ATC may ascertain whether there are other ATCs located in a territorial route.

Subsequently, the ATC relays data between the MES and the satellite via an ATC that is able to receive the service from the satellite from among a plurality of other ATCs in operation S409.

That is, the ATC may transfer data received from the MES to the satellite via another ATC and transfer response data with respect to the data received from the satellite via the other ATC to the MES. In this instance, since the ATC may be connected with the other ATC by wire, wired communication is possible.

Accordingly, the ATC continuously relays data between the MES and satellite by performing handover to the other ATC, and thereby may provide service without disconnection.

According to example embodiments, there is provided an NGSO communication apparatus which extends an operation time and reduces a number of satellites, and may extend a service area and an operation time with respect to a single satellite using a plurality of ATCs. Accordingly, the NGSO communication apparatus may provide service without becoming disconnected using a small number of satellites.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A non geostationary satellite orbit (NGSO) communication apparatus for extending an operation time and reducing a number of satellites using an ancillary terrestrial component (ATC), the apparatus comprising:
    a first ATC to communicate with a mobile earth station (MES); and
    a second ATC to communicate with the first ATC to relay data between the MES and a satellite when the first ATC is unable to communication with a satellite that revolves along an orbit.

2. The apparatus of claim 1, wherein the first ATC relays the data between the MES and the satellite when the first ATC is able to communicate with the satellite.

3. The apparatus of claim 1, wherein the satellite compares signal strength of data received from the first ATC and signal strength of data received from the second ATC to communicate with an ATC having signal strength of data greater than the other ATC.

4. The apparatus of claim 1, wherein one of the first ATC and the second ATC is located in a service area enabling direct communication with the satellite, and the other ATC is located outside of the service area.

5. The apparatus of claim 1, wherein the first ATC and the second ATC are located in a territorial route of a satellite and connected by wire.

6. An ATC comprising:
    a determining unit to determine whether receiving a service from a satellite is possible when a request for relaying data between an MES and the satellite is received;
    a searching unit to search for other ATCs when unable to receive the service; and
    a communication unit to transmit and receive data between the MES and the satellite via an ATC that is able to receive the service from the satellite, from among the other ATCs.

7. The ATC of claim 6, wherein, when the determining unit determines that the receiving of the service from the satellite is possible as a result of the determination, data between the MES and the satellite is transmitted/received.

8. An operating method of an ATC, the method comprising:
    receiving a request for relaying data between an MES and a satellite;
    determining whether receiving a service from the satellite is possible;
    searching for other ATCs when unable to receive the service from the satellite; and
    relaying data between the MES and the satellite via an ATC that is able to receive service from the satellite, from among the other ATCs.

9. The method of claim 8, further comprising:
    relaying data between the MES and the satellite when a determining unit determines that the receiving of the service from the satellite is possible as a result of the determination.

10. The method of claim 8, wherein the receiving of the request receives the request for relaying the data from at least one of the MES, the satellite, and the other ATCs.

* * * * *